WILLIAM A. RAY, INVENTOR.

BY John Ham ATTORNEY

Dec. 21, 1954 W. A. RAY 2,697,581
ELECTROMAGNETICALLY OPERATED VALVE WITH ADJUSTABLE OPENING
Filed Feb. 14, 1949 2 Sheets-Sheet 2

WILLIAM A. RAY,
INVENTOR.

BY John Flam
ATTORNEY

United States Patent Office 2,697,581
Patented Dec. 21, 1954

2,697,581

ELECTROMAGNETICALLY OPERATED VALVE WITH ADJUSTABLE OPENING

William A. Ray, North Hollywood, Calif., assignor to General Controls Co., a corporation of California Application February 14, 1949, Serial No. 76,388

12 Claims. (Cl. 251—129)

This invention relates to valves, and particularly to sanitary valves for dispensing liquids, such as cream, coffee, or the like.

Automatic dispensing of coffee, or other drinks having several ingredients, may be accomplished by aid of electrically operated valves. A control circuit for the valves is usually provided, said circuit having a timer for metering the ingredients. To obtain the desired proportions, the valves must be arranged either to shut off after the proper intervals, or the rates of discharge must be properly adjusted.

It is one of the objects of this invention to provide a simple and effective valve structure that fulfills these requirements.

It is another object of this invention to provide a sanitary valve structure that may be readily taken apart for such frequent cleaning, as the nature of the liquids being dispensed requires.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings.

Figure 1:
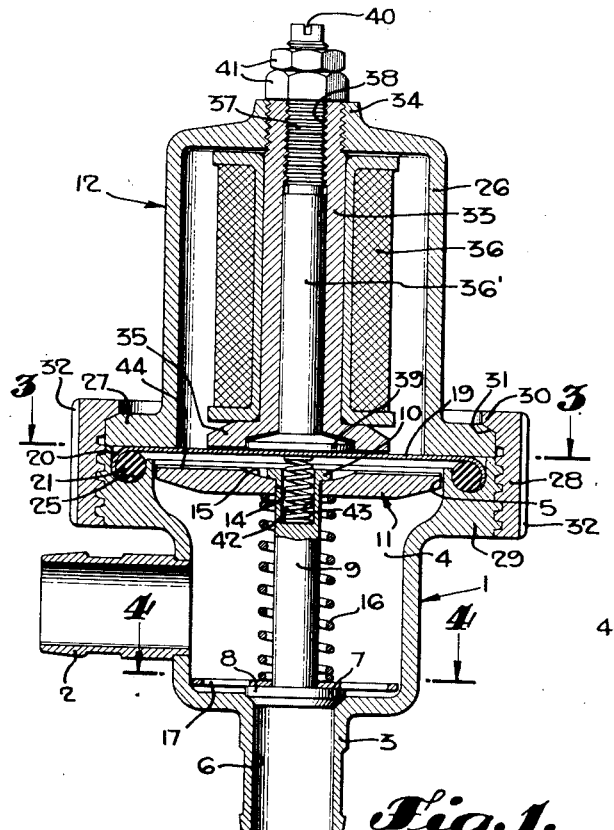
Figure 1 is a longitudinal section of a valve incorporating the invention.
Figure 3:
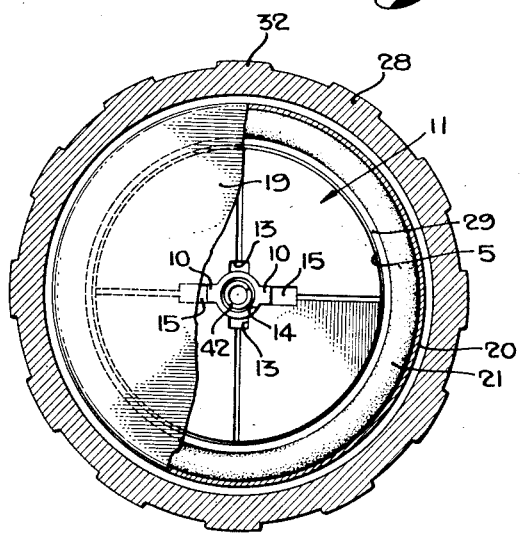
Figure 4:
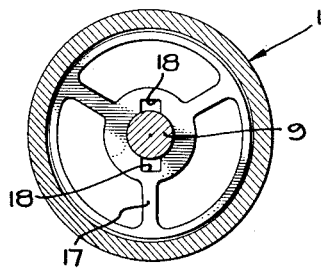
Figure 6:
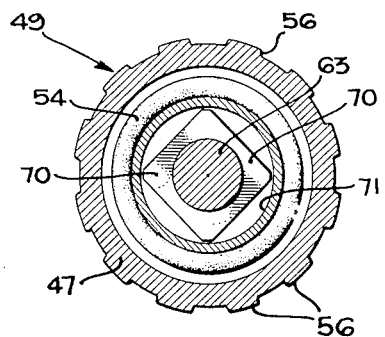
Figure 5:
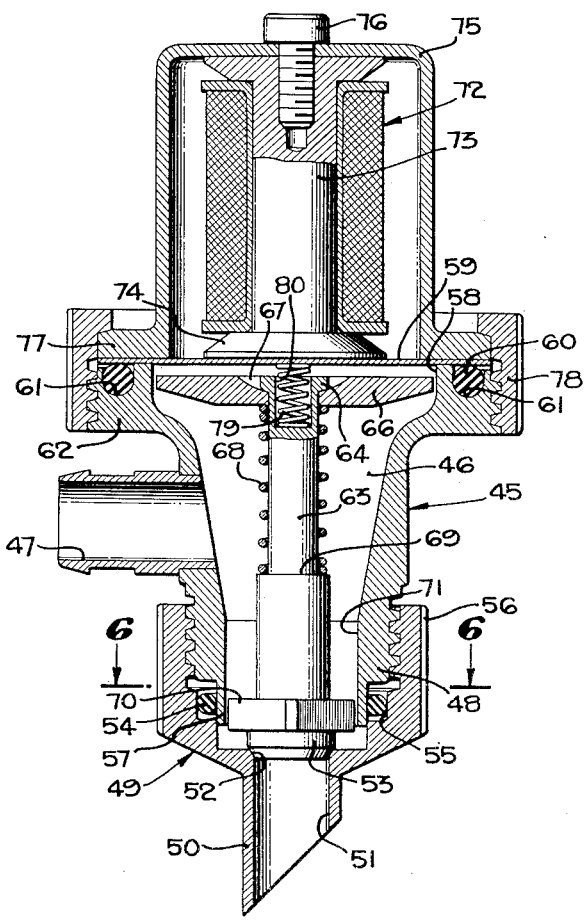
Figure 7:
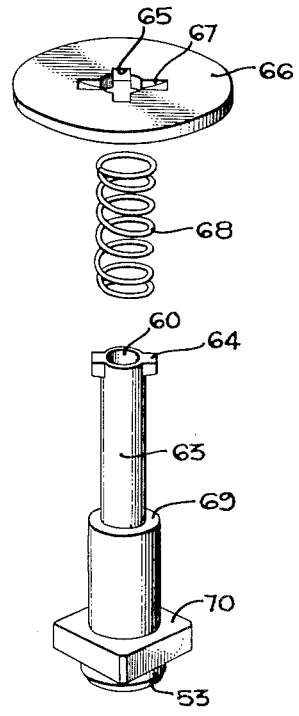

Figs. 3 and 4 are sectional views, taken along planes corresponding to lines 3—3 and 4—4 of Fig. 1;

Fig. 5 is a sectional view, similar to Fig. 1, of a modified form of the invention;

Fig. 6 is a sectional view, taken along a plane corresponding to line 6—6 of Fig. 5;

Fig. 7 is an exploded view of some of the valve elements utilized in connection with the valve illustrated in Fig. 5.

In the form illustrated in Figs. 1 to 4, inclusive, an electromagnetically operated valve is illustrated. The valve includes a hollow valve body 1 of generally circular configuration. This valve body 1 has an inlet connection 2, which may be appropriately fastened into the left-hand side of the body 1, and which may be formed so as to provide a hose coupling, or the like.

An outlet spout 3 extends centrally downwardly from the bottom wall of the body 1. It is formed integrally with the body 1, and may be also formed so as to accommodate a coupling or connection.

The chamber 4 has an opening 5 at the top which is larger in diameter than the lower portion of the body 1. This opening 5 is opposite the spout opening 6.

The upper edge of this opening 6 forms a tapered valve seat 7. Since the spout 3 is formed integrally with the body 1, and since there are smooth surfaces leading to the top of the opening 6, there is no opportunity for retention of liquid within the body 1 when the valve is open; instead, the liquid can flow rapidly outwardly and downwardly through the spout opening 6, without drooling or dripping.

A valve closure structure is provided to control the passage through the opening 6 of spout 3. Thus, adapted to be seated upon the seat 7 is a disc-like closure member 8 (see, also, Fig. 2). This closure member 8 is provided with an integral cylindrical stem 9 which projects upwardly and terminates in an extension provided with diametrically opposed radial keys or extensions 10. By the aid of the keys 10 a magnetic disc armature 11 is detachably mounted upon the stem 9. This magnetic armature 11, as described hereinafter, is adapted to be influenced by an electromagnet structure 12 mounted externally of the body 1.

The disc 11 has a relatively small clearance with respect to the opening 5, and may be placed upon the stem 9 by the provision of the keyhole slots 13 radially extending from the central opening 14 of the disc 11. In assembling armature 11 with the stem 9, the radial projections or keys 10 of the stem 9 are aligned with the keyholes 13; then the armature 11 is passed downwardly. A relative rotation of ninety degrees between the stem 9 and the armature 11 brings the keys 10 into alignment with the radial slots or grooves 15 disposed in the upper face of the armature 11. In this way, relative rotation is prevented between the disc 11 and the stem 9, thus preventing inadvertent alignment of the key projections 10 with the keyholes 13, and a consequent inadvertent separation of the stem 9 and the armature 11.

Figure 2:
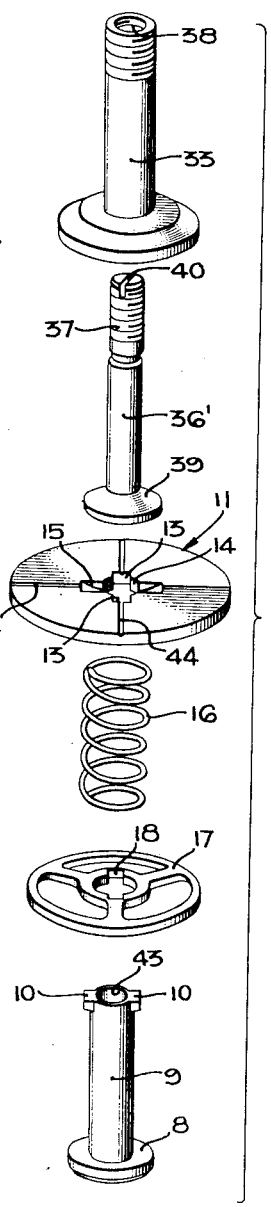
Fig. 2 is an exploded view of some of the valve elements.

In order to maintain the key projections 10 within the slots 15 against axial separation, use is made of a compression spring 16 which surrounds the stem 9. Its upper end abuts against the lower surface of the disc 11, while its lower end contacts the upper surface of a guiding ring 17. This guiding ring 17, shown most clearly in Figs. 2 and 4, is in the form of a spider provided with radial keyhole slots 18 to permit the ring 17 to pass over the keys 10 of the stem 9. This ring or spider 17 has a diameter only slightly smaller than the interior diameter of the body 1, whereby it is assured that the axis of stem 9 cannot be greatly misaligned from the axis of the spout 3. The armature disc 11 performs a like function at the upper end of the stem 9.

Opening and closing of the valve is effected by raising the stem 9 to move the closure 8 away from the seat 7. The electromagnet structure 12 is provided to perform the opening function.

In order to seal the body 1 above the opening 5, use is made of a movable wall structure, such as a flexible diaphragm 19. This diaphragm 19 extends over the opening 5. It is provided with the downwardly and inwardly directed rolled edge 20 in which is seated a round rubber ring, or O-ring, 21. This O-ring 21 is similarly accommodated in an annular groove 25 having a circular cross section provided in the flange 29 forming the upper wall of the body 1.

As hereinafter explained, the outer edge of the diaphragm 19 is urged downwardly in order to seal the chamber 4.

Mounted above the diaphragm 19 a hollow magnetic shell 26 is provided. This magnetic shell forms a portion of the magnetic circuit for the electromagnet structure 12. It is provided with a lower outwardly extending flange 27 disposed above the edge of the diaphragm 19. In order to provide a readily detachable fastening means for the shell 26, and for clamping the diaphragm 19 in fluid-tight relation with respect to the body 1, use is made of an internally square threaded ring 28. This ring 28 is adapted to engage corresponding threads on the exterior surface of the flange 29. The ring is large enough in diameter to be passed completely over the shell 26 and thereby to engage the threads of the body 1. The ring 28 furthermore is provided with a flange 30 that has a sloping surface 31 adapted to engage a corresponding sloping surface at the upper edge of the flange 27.

In order to make it easy to separate the valve body 1 from the shell 26, the exterior surface of the ring 28 is notched or serrated as indicated at 32.

By the aid of this arrangement it is a simple matter to remove the ring 28 and to remove the shell 26 from above the body 1. Then the diaphragm 19 may be lifted off, and the valve parts, including the armature 11, stem 9, and closure 7, may then be readily separated for frequent cleaning. This frequent cleaning is desired when the valve is used for dispensing liquids, such as cream, coffee, or the like.

The operating electromagnet structure 12 includes a central core structure comprising a hollow core 33. This hollow core is externally threaded at the top and is threaded into the boss 34 at the top wall of the shell 26. Its lower portion is provided with a flange or pole piece overlying the diaphragm 19. An operating electromagnet coil 36 is disposed around the core 33. When energized, the core 33 is magnetized, and the armature disc 11 is lifted in order to lift the closure 8 from its seat 7.

In dispensing liquid for a definite time interval, the amount of liquid discharged can be regulated by regulating the extent of opening of the valve. This regulating or adjustment is provided, in this instance, by the provision of a central core 36' which has an upper threaded portion 37. This threaded portion is adjustably threaded into a corresponding threaded aperture 38 arranged at the top of the hollow core 33. The lower end of the core 36' is provided with a pole piece 39 which is telescoped within a recess in the lower face of the pole piece or flange 35 of the hollow core member 33. The vertical position of the inner core 36' can be adjusted by turning the core 36' with respect to the hollow core 33, thereby causing the threaded portion 37 to advance or to retract with respect to the hollow core 33. The adjustment is facilitated by the provision of a slot 40 extending transversely across the top of the threaded extension 37. Locking nuts 41 may be provided to maintain the adjustment.

When the electromagnet coil 36 is energized, the disc 11 is lifted against the diaphragm 19 which forms a stop against upward movement of the valve stem 9. The lower face of pole piece 39 serves as an abutment or stop for the flexible diaphragm 19. Accordingly, the vertical position of the core 36' determines the open position of the closure 8. When the core 36' is moved upwardly by threading it further upward into the hollow core 33, the diaphragm 19 can be flexed upwardly against the lower face of the pole piece 39, and the valve can be opened to a greater extent. Lowering of the core 36' reduces this opening.

When the electromagnet coil 36 is de-energized, the stem 9 is urged downwardly by the aid of a light compression spring 42. This compression spring is located in a recess 43 in the upper end of the stem 9. The upper end of the spring contacts the lower face of the diaphragm 19.

Furthermore, to ensure against trapping of any liquid between the upper face of the disc 11 and the diaphragm 19, radial grooves 44 are provided in the upper face of the disc 11.

The vertical spacing between the seat 7 and the lower face of pole piece 39 determines the extent of opening movement of the stem 9. This vertical distance is adjustable, as heretofore explained, by adjusting the vertical position of the core 36'.

By the aid of the construction described, frequent cleaning of the valve parts is facilitated, since the ring 28 may be readily removed, and access to the valve parts is obtained by removing the diaphragm 19. Then the valve parts may be separated in the manner illustrated in Fig. 2 and thoroughly cleaned before reassembling.

It is possible to adjust the extent of movement of the valve stem in other ways. One other way is illustrated in the form shown in Figs. 5, 6 and 7. In this form a valve body 45 is again shown as forming a chamber 46 of generally circular configuration. The inlet member 47 extends from the left-hand side of the chamber 46. The lower end of the valve body 45 has a reduced threaded extension 48. Threaded over this extension is a spout-forming member 49. Integrally formed with the spout-forming member 49 is the spout 50 having an opening 51 axially aligned with the closure structure. The upper edge of this opening 51 is provided with a tapered valve seat 52 with which cooperates a closure 53.

Sealing is effected between the member 49 and the body 45 by the interposition of a sealing O-ring 54. This sealing ring is accommodated in the annular space between the reduced cylindrical extremity 57 of the extension 48 and an inner cylindrical surface 55 formed below the threads of the member 49. The member 49 may furthermore be provided with the serrations 56 to facilitate the manual operation of adjusting the position of the spout 50 with respect to the body 45.

As before, the upper large opening 58 of the valve body 45 is sealed by a flexible diaphragm 59. This flexible diaphragm 59 is sealed by the aid of an O-ring 60 accommodated in an annular groove 61, formed in the flange 62 at the upper end of the body 45.

The valve closure 53 is formed integrally with a stem 63 that is provided with key projections 64. As before, these key projections serve to pass through key slots 65 of the armature disc 66. This armature disc 66 is provided with radial slots 67 to accommodate these key projections 64 and to maintain the parts against relative angular movement. A compression spring 68 maintains the projections 64 against relative axial movement with respect to the disc 66. The lower end of the stem 63 is provided with a generally square flange 70, the corners of which have clearance with the cylindrical surface 71 formed in the interior of the extension 48. In this way, it is assured that the axis of the stem 63 will not be too greatly misaligned with respect to the axis of the seat 52.

The opening of the valve is effected by energizing an electromagnet coil 72. This coil is disposed over a solid central core 73 having a pole piece 74 in contact with the upper surface of the diaphragm 59. The core 73 is joined to the shell 75, made from magnetic material, as by the aid of a screw 76. Flange 77 of the shell 75 is urged in place, as before, by the aid of an internally threaded ring 78. As in the first form, a light compression spring 79 is disposed in a recess 80 in the stem 63 for urging the stem 63 downwardly to the closed position when the coil 72 is de-energized.

The vertical separation between the valve seat 52 and the face of the pole piece 74 is adjustable, in this instance, by adjusting the position of the spout-forming member 49. This is accomplished by turning this spout member 49 with respect to the body 45 to advance or retract the spout-forming member 49 with respect to the body. The O-ring 54 ensures against leakage of the valve around the spout 50. Furthermore, since the spout 50 is formed integrally with the member 49, and since the upper edge of the opening 51 forms the valve seat 52, complete discharge of liquid through the spout is assured without drooling or dripping.

The form shown in Figs. 5 through 7 is described and claimed in a divisional application Serial No. 422,507, filed April 12, 1954, entitled Valve with Adjustable Opening.

The inventor claims:

1. In a valve structure: a valve body providing a valve seat; a movable closure member in the body cooperating with the seat; said body having an opening opposite said seat; a movable wall closing and sealing said opening; said valve closure having an armature in said body; said wall being in the path of movement of the armature to limit opening movement of the closure; an electromagnet exterior of the body, for moving the armature toward the wall, and having an adjustable member that forms a stop for the wall; and means for securing said member in an adjusted position.

2. In a valve structure: a valve body providing a valve seat; a movable closure member in the body cooperating with the seat; said body having an opening opposite said seat; a flexible diaphragm closing said opening; said closure having an armature in said body; said diaphragm being in the path of movement of said armature to limit opening movement of the closure; an electromagnet exterior of the body for moving the armature toward the diaphragm, and having a core at least a part of which is adjustable to provide an adjustable stop for the diaphragm; and means for securing said core in an adjusted position.

3. In a valve structure: a valve body providing a valve seat; a movable closure member in the body cooperating with the seat; said body having an opening opposite said seat; a flexible diaphragm closing said opening; said closure having an armature in said body; said diaphragm being in the path of movement of said armature to limit opening movement of the closure; an electromagnet exterior of the body for moving the armature toward the diaphragm, said electromagnet adjustably mounting a central core for movement toward and away from the diaphragm; and means for securing said central core in an adjusted position.

4. In an electromagnetically operated valve: a valve body having an opening at one end and a valve seat at the opposite end; a valve closure structure in the body having a closure at one end cooperating with the seat, and an armature at the opposite end and located in the opening; a diaphragm closing the opening; a resilient ring adjacent the edge of the diaphragm; a ring threaded on the body and clamping the edge of the diaphragm; an electromagnet exterior of the body and having a core adjustable with respect to the diaphragm; and means securing the core in an adjusted position.

5. In an electromagnetically operated valve: a valve body having an opening at one end; a movable member in the body having an armature at one end thereof and located at the opening; a diaphragm closing the opening; a magnetic shell disposed over the diaphragm; a hollow core supported by the end of the shell; an adjustable core threadedly engaging the hollow core for limiting the outward movement of the diaphragm.

6. In an electromagnetically operated valve: a valve body having an opening at one end; said body having means forming an annular groove around the opening; a resilient annular packing ring in the groove, said resilient ring extending above the sides of the groove, said resilient ring having a substantially circular cross section; a diaphragm covering the opening and having a peripheral portion overlying said resilient ring; and means for clamping the peripheral portion of the diaphragm to the ring.

7. In an electromagnetically operated valve: a valve body having an opening; said body having means forming a continuous groove opening in a direction outwardly of said body opening; a resilient ring in the groove, said ring extending above the inner side of the groove; a uniformly flexible diaphragm covering the opening and having a peripheral portion overlying the resilient ring; and means for clamping the peripheral portion of the diaphragm to the ring.

8. In an electromagnetically operated valve: a valve body having an opening; said body having means forming a continuous groove opening in a direction outwardly of said body opening; a resilient ring in the groove, said ring extending above the inner side of the groove; a uniformly flexible diaphragm covering the opening and having a peripheral portion overlying the resilient ring; and means for clamping the peripheral portion of the diaphragm to the ring; said resilient ring being substantially arcuate between the point of contact of said diaphragm and the inner side of said groove.

9. In an electromagnetically operated valve: a valve body having an opening; said body having means forming a continuous groove opening outwardly of said body opening; a continuous resilient ring in the groove, said ring extending above the inner side of the groove; a flexible diaphragm covering the opening and having a peripheral portion in engagement with the resilient ring; means for clamping the peripheral portion of the diaphragm to the ring; and an adjustable wall exterior of said valve body for adjustably positioning said diaphragm.

10. In an electromagnetically operated valve: a valve body having an opening; said body having means forming a continuous groove opening outwardly of said body opening; a continuous resilient ring in the groove, said ring extending above the inner side of the groove; a flexible diaphragm covering the opening and having a peripheral portion in engagement with the resilient ring; means for clamping the peripheral portion of the diaphragm to the ring; a valve closure member having an armature movable transversely of the diaphragm and engageable therewith; an electromagnet for moving the armature; and an adjustable wall for defining a limiting position of said diaphragm for limiting movement of said armature.

11. In an electromagnetically operated valve: a valve body having an opening; said body having means forming a continuous groove opening outwardly of said body opening; a continuous resilient ring in the groove, said ring extending above the inner side of the groove; a flexible diaphragm covering the opening and having an inwardly turned edge receiving said resilient ring; means for clamping the peripheral portion of the diaphragm to the ring; and an adjustable wall exterior of said valve body for adjustably positioning said diaphragm.

12. In an electromagnetically operated valve: a valve body having an opening at one end; a movable member in the body having an armature at one end thereof and located at the opening; a diaphragm closing the opening; a magnetic shell disposed over the diaphragm; a core adjustably mounted by said shell for limiting outward movement of the diaphragm; a coil for magnetizing the core; and means for securing the core in an adjusted position.

References Cited in the file of this patent

UNITED STATES PATENTS

| Number | Name | Date |
|---|---|---|
| 62,722 | Zundorff | Mar. 5, 1867 |
| 74,480 | Anderson | Feb. 18, 1868 |
| 542,126 | Winther | July 2, 1895 |
| 981,087 | Hoyt | Jan. 10, 1911 |
| 1,051,350 | Nogier | Jan. 21, 1913 |
| 1,131,399 | McGinley | Mar. 9, 1915 |
| 1,175,864 | Gold | Mar. 14, 1916 |
| 1,914,123 | Hapgood | June 13, 1933 |
| 2,321,853 | Ray | June 15, 1943 |
| 2,325,878 | Ray | Aug. 3, 1943 |
| 2,331,503 | Ray | Oct. 12, 1943 |
| 2,353,848 | Ray | July 18, 1944 |
| 2,435,076 | Hall | Jan. 27, 1948 |
| 2,484,083 | Findley | Oct. 11, 1949 |
| 2,574,574 | Ives | Nov. 13, 1951 |

FOREIGN PATENTS

| Number | Country | Date |
|---|---|---|
| 692,963 | France | Nov. 13, 1930 |